United States Patent

[11] 3,537,616

[72] Inventors Howard Diebel and
Jay B. S. Moyer, Jordan Village, and
John F. Pond, Box 120, Vineland Station,
Ontario, Canada
[21] Appl. No. 750,285
[22] Filed Aug. 5, 1968
[45] Patented Nov. 3, 1970

[54] DRINK DISPENSING APPARATUS WITH EMPTY CONTAINER CUT-OFF
7 Claims, 1 Drawing Fig.
[52] U.S. Cl. .................................................. 222/66, 137/395
[51] Int. Cl. .................................................. B67d 5/32
[50] Field of Search .......................................... 222/66, 56, 57, 129.4; 137/399, 395, 402, 403, 408(Cursory)

[56] References Cited
UNITED STATES PATENTS
2,381,505  8/1945  Lindholm ..................... 222/56

| | | | |
|---|---|---|---|
| 2,952,209 | 9/1960 | Scholin ........................ | 222/66X |
| 3,151,775 | 10/1964 | Whitehead .................. | 222/57 |
| 3,305,132 | 2/1967 | Coja ............................ | 222/66 |

Primary Examiner—Samuel F. Coleman
Assistant Examiner—H. S. Lane
Attorney—Church and Rogers ABSTRACT: In a drink dispensing apparatus of the type wherein a drink component such as a syrup is mixed with water to provide the drink, the presence or absence of the drink component is detected by weighing a portion of the pipe means that feed the component to the dispensing station; this portion preferably takes the form of a multiturned coil that is connected by flexible junctions to the remainder of the pipe and is mounted on one end of a balance beam; the other end of the beam carries an adjustable counterweight for adjusting the balance of the beam, and moves to operate a cooperating microswitch when the pipe coil empties; the apparatus is arranged to prevent dispensing of the corresponding drink and also to give an "empty" signal.

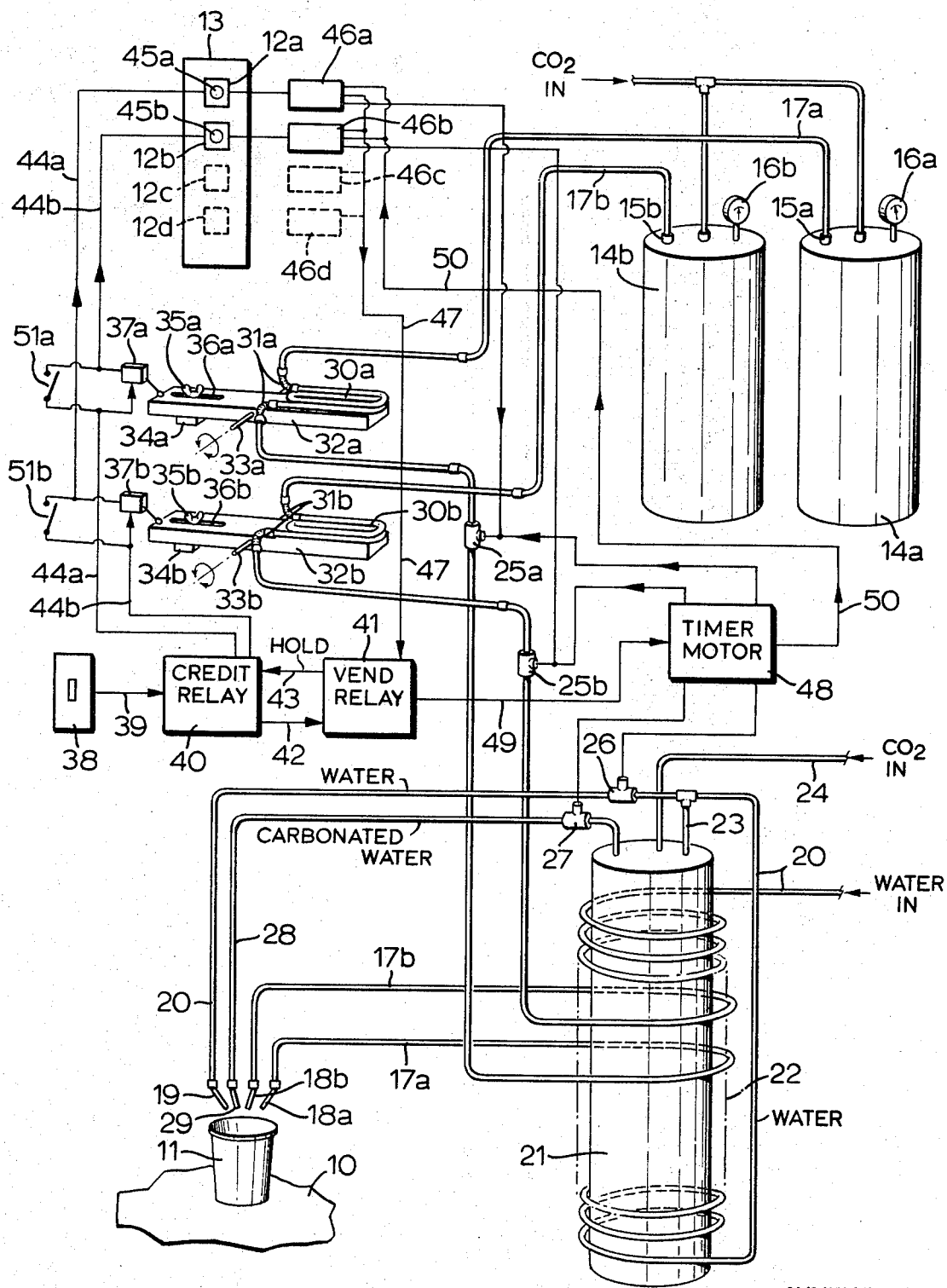

DRINK DISPENSING APPARATUS WITH EMPTY CONTAINER CUT-OFF

DRINK DISPENSING APPARATUS

This invention is concerned with improvements in or relating to drink dispensing apparatus, and especially to such apparatus of the type in which the drink supplied to a dispensing station comprise a mixture of water and a drink component syrup.

SUMMARY OF THE INVENTION

It is an object of the invention to provide a new drink dispensing apparatus comprising means for determining the presence or absence of a drink component therein.

In accordance with the present invention there is provided drink dispensing apparatus comprising a dispensing station, at least one source of a liquid drink component, respective pipe means for feeding each liquid drink component from its source to the station, each pipe means including at least a portion thereof flexibly connected to the remainder of the pipe means, valve means in each pipe means operable to permit or prevent said dispensing to the station, weighing means operatively engaging said flexibly connected pipe portion for weighing the said portion to determine the presence or absence of liquid drink component therein, and operative means operatively connecting the said weighing means and the valve means to prevent dispensing of a drink to the station upon detection by the weighing means of the absence of drink component in the said portion of the pipe means.

DESCRIPTION OF THE DRAWINGS

A particular preferred embodiment of the invention will now be described, by way of example, with reference to the accompanying diagrammatic drawing comprising a schematic diagram illustrating the general arrangement of the components of the drink dispensing apparatus, and of the associated electrical circuit.

DESCRIPTION OF THE PREFERRED EMBODIMENTS

It will be understood by those skilled in the art that the parts illustrated by the accompanying drawing will normally be mounted in some convenient manner in a locked cabinet, which is not shown. It will also be understood by such persons that the electrical circuit is shown in the form of functional modules, each module usually comprising one or more cooperating relays; a full description of the structure is not necessary for a full understanding of the operation of the present invention and consequently is omitted for the sake of brevity.

The apparatus comprises a dispensing station, indicated herein by the tray 10, to which cups 11 are dispensed in known manner by a conventional cup dispensing mechanism (not shown), upon operation of the apparatus by an intended drink purchaser, including the supply of the required payment thereto.

In the apparatus illustrated drinks of at least two different flavors can be supplied to the dispensing station, the choice being made by the intending purchaser by pressing the appropriate pushbutton 12a 12b, 12c, or 12d of a pushbutton selector panel 13 suitably mounted on the front face of the machine. Although in the embodiment particularly described herein provision is made for the supply of only two flavors, this is merely to avoid unnecessary repetition of description, and the application of the invention to a machine dispensing more than two flavors will be apparent to those skilled in the art.

In this particular embodiment the different flavors are imparted to the drink by means of a respective syrup component that is diluted with water, the syrups being provided by means of replaceable containers 14a and 14b, which are internally pressurized by supplying $CO_2$ thereto, each being provided with respective quickly detachable connections 15a and 15b and a pressure gauge 16a and 16b. Each container is connected via respective pipe means 17a and 17b to a respective nozzle 18a and 18b, from which the syrup is discharged into the cup 11.

Water is supplied to a nozzle 19 at the dispensing station via a pipe 20, which is connected to a suitable main supply and is wound around the outside of a refrigeration unit 21, the pipe and the refrigeration unit being enclosed in a suitable insulated container indicated herein by the broken line 22. Water is also fed to the interior of the refrigeration unit via a pipe 23, and is carbonated by mixing it therein with carbon dioxide provided from a suitable supply container (not shown) via a pipe 24. The flow of the syrups from the containers 14a and 14b is controlled by respective electrically operated valves 25a and 25b in the pipes 17a and 17b; the uncarbonated water is controlled by a valve 26, while the carbonated water is controlled by a valve 27, disposed in a pipe 28 that feeds the liquid to the remaining nozzle 29.

The pipe means 17a between the container 14a and the nozzle 18a includes a portion thereof having the form of a multiturned coil 30a, this portion being connected to the remainder of the pipe means via flexible sections 31a, which allow the coil to move freely relative to the adjacent portions of the pipe means. The coil is securely mounted adjacent one end portion of a pivoted beam member 32a comprising a first order lever pivotally mounted to the frame of the apparatus (not shown) approximately at its midpoint by a pivot rod 33a carried by suitable bearings (also not shown). The beam is provided with a counterweight 34a which is releasably fastened adjacent the other end of the beam by means of a bolt and cooperating butterfly nut 35a, the bolt moving in a slot 36a that is elongated lengthwise of the beam, the counterweight being moved whenever necessary to adjust the balance of the weighing beam member, and thereby compensate for variables, such as differences in weight of the coil portions 30 and differences in the densities of the syrups. A microswitch 37a is mounted adjacent one end of the beam and has its operating arm engaged with and movable by the beam to operate the switch as the beam moves about its pivot. The portion of the pipe means immediately behind the valve 25a is maintained full of syrup as long as syrup is available, by compressed gas in this embodiment, but possibly also by other means such as gravity or a conventional pump system. It will be seen that with the coil portion 30a full of syrup the weighing beam will tend to move clockwise as seen in FIG. 1, in the direction of the respective arrow, and in setting up the apparatus before the beginning of the operations, the counterweight 34a is moved to a position in which the beam member is approximately horizontal and the microswitch is in its desired operative condition. When the syrup becomes effectively exhausted the portion thereof originally in the coil will be replaced by the propellant gas, decreasing substantially the weight of the coil, whereupon the beam 32a will rotate anticlockwise, in the direction of the respective arrow, and cause a change in the operative condition of the switch. The operation of the associated electrical circuit will be described below, and in general it is such that an indication is given to the intending purchaser that that particular flavor is no longer available, and the apparatus will not attempt to dispense a drink with syrup from that particular container, even if an attempt is made to do so by the purchaser pushing the appropriate selector button.

Reference has been made only to to the weighing beam 32a and its mode of operation, but the operation of the corresponding beam 32b and the associated equipment (indicated generally by use of the postscript b) will be apparent. A center-pivoted first order lever weighing beam has been particularly described, but other similar mechanical weighing apparatus can also be employed, for example an end-pivoted lever that has its other end supported by a spring.

The apparatus normally will of course remain in a quiescent state until the intending purchaser feeds the required coinage to a coin-receiving mechanism 38, that will operate to accept or reject the coins, provide change if necessary, and provide an indication such as a lighted signal that sufficient payment has been made. In addition the mechanism 38 will also provide a signal via a connection 39 to a credit relay module 40.

Upon receipt of this signal the module 40 feeds a corresponding signal to a vend relay module 41 via a a, b, a, b, a, b, a, b, a, connection 42 and in turn receives a "hold" signal from the module 41 via connection 43. The credit relay module also responds to the signal from coin mechanism 38 by feeding signals to the selector pushbuttons 12a, 12b, etc. via respective connectors 44a, 44b, etc. and the respective switches 37a, 37b, etc. Upon receipt of a signal from the credit relay module a lamp 45a, 45b, etc. in the respective selector switch lights, and an associated selector relay 46a, 46b is set up for operation.

If any of the syrups is not available, or has become exhausted, then this will be detected by the respective weighing device and the associated switch 37 will be open, so that the associated selector switch lamp 45 remains unlit and the selector relay is unaffected.

The selection and dispensing of a drink is carried out by the purchaser pressing one of the lighted pushbuttons, a conventional electrical or mechanical interlock being provided to take care of the possibility that two buttons may be pressed simultaneously. The pressing of an unlit button has no further effect, while the pressing of a lit button energizes the respective selector relay and thence the vend relay module via connection 47. A timer motor module 48 is now set through connection 49 and in turn holds in the energized selector relay via a connection 50; the vend relay module is actuated to release the hold circuit of the credit relay module and open the circuits to the switches 12, so that the lamps 45 go out. The vend relay module now causes operation of the timer motor module 48 to open the selected valve 25 for which the respective relay 46 has been energized, together with one or both of the valves 26 and 27, for a predetermined period of time and thereby deliver a measured drink to the cup 11. At the conclusion of its operation the timer motor module breaks the hold circuit of the selector relays 46 and the apparatus is again ready to dispense a drink.

Each switch 37 is provided with a parallel switch 51 which can be closed for the purpose of testing or filling with the respective drink component. In this embodiment the switches 37 are opened upon the absence of the respective syrup, but it will be apparent to those skilled in the art that equally effective operation could be achieved in an appropriate circuit if this condition caused the switches to close. Although the invention has been described in connection with apparatus employing concentrated syrups, it will be apparent that it also is applicable to apparatus storing drinks in the form in which they are dispensed. The coils 30 have been described herein as connected by flexible portions 31 to the remainder of the pipe means, but it is also possible for all of the pipe means to be of suitable flexible tubing, so that separate flexible connecting portions are not required. Other variations within the scope of the appended claims will be apparent to those skilled in the art.

We claim:

1. Drink dispensing apparatus comprising a dispensing station, at least one source of a liquid drink component, respective pipe means for feeding each liquid drink component from its source to the station, each pipe means including at least a portion thereof flexibly connected to the remainder of the pipe means, valve means in each pipe means operable to permit or prevent said dispensing to the station, weighing means operatively engaging said flexibly connected pipe portion for weighing the said portion to determine the presence or absence of liquid drink component therein, and operative means operatively connecting the said weighing means and the valve means to prevent dispensing of a drink to the station upon detection by the weighing means of the absence of drink component in the said portion of the pipe means.

2. Drink dispensing apparatus as claimed in claim 1, wherein the said weighing device comprises a pivoted beam member with the flexibly connected portion of the said pipe means mounted thereon, the said operative means being responsive to movement of the beam member about its pivot to operate the said valve.

3. Drink dispensing apparatus as claimed in claim 2, wherein the said beam member comprises a first order lever having the said pipe means portion mounted adjacent one end and the said operative means responsive to movement of the other end.

4. Drink dispensing apparatus as claimed in claim 3, wherein the said beam member comprises a counterweight mounted adjacent the said other end and movable toward and away from the beam pivot for adjustment of the balance of the member.

5. Drink dispensing apparatus as claimed in claim 3, wherein the said valve means comprises a solenoid-operated valve and the said operative means comprise an electric switch and an electric circuit connecting the switch and the valve solenoid, the switch having its control element operatively connected to the respective end of the beam member for movement thereby.

6. Drink dispensing apparatus as claimed in claim 2, wherein the said pipe means portion comprises a relatively rigid multiturn coil thereof mounted on the beam member, the said coil being connected at its ends by respective flexible portions to the remainder of the pipe means.

7. Drink dispensing apparatus as claimed in claim 1, wherein the said drink component comprises a syrup, and the source of the component comprises an internally pressurized container connected to the pipe means and supplying the component thereto under pressure.